United States Patent [19]

Blaker

[11] Patent Number: 5,062,212

[45] Date of Patent: Nov. 5, 1991

[54] SUNDIAL APPARATUS

[76] Inventor: James L. Blaker, 1150 Archer La., Lansdale, Pa. 19446

[21] Appl. No.: 622,630

[22] Filed: Dec. 5, 1990

[51] Int. Cl.[5] ............ G01C 12/34

[52] U.S. Cl. ............ 33/270

[58] Field of Search ............ 33/268–271

[56] References Cited

U.S. PATENT DOCUMENTS

| | | | |
|---|---|---|---|
| 740,978 | 6/1903 | Hewitt | 33/270 |
| 825,319 | 7/1906 | Hewitt | 33/270 |
| 1,651,621 | 12/1927 | O'Sullivan | 33/270 |
| 2,192,750 | 3/1940 | Mead | 33/270 |
| 2,415,433 | 2/1947 | Little | 33/270 |
| 4,413,423 | 11/1983 | Galvin | 33/268 |
| 4,602,259 | 7/1986 | Shepard | 33/268 |
| 4,845,853 | 7/1989 | Haskett | 33/270 |

*Primary Examiner*—William A. Cuchlinski, Jr.
*Assistant Examiner*—Alvin Wirthlin
*Attorney, Agent, or Firm*—Leon Gilden

[57] ABSTRACT

A sundial apparatus is arranged wherein a sundial head mounts a semi-cylindrical sundial face mounting a vertical and horizontal cross hair to define time of day, as well as an associated weekly period during a solar year. The sundial face is mounted within a head member that in turn is rotatably mounted upon an upper rotater plate. The upper rotater plate is pivotally mounted between first and second "L" shaped support plates, and the "L" shaped support plate is rotatably mounted upon a mounting plate, with the mounting plate fixedly secured to a support member such as a post.

2 Claims, 6 Drawing Sheets

PRIOR ART

SUNDIAL APPARATUS

BACKGROUND OF THE INVENTION

1. Field of the Invention

The field of invention relates to sundial apparatus, and more particularly pertains to a new and improved sundial apparatus wherein the same provides three planes of rotation and adjustment of the sundial to permit ease of mounting and positioning of a sundial relative to any geographical location.

2. Description of the Prior Art

The prior art has utilized sundial apparatus for much of recorded history, but has heretofore failed to provide an organization as set forth by the instant invention which presents the sundial apparatus for ease of initial positioning and arrangement relative to a given geographical location to accommodate various geographical latitude, as well as orienting the sundial organization in an arrangement parallel to the earth's rotational axis. Prior art organizations may be found and exemplified in U.S. Pat. No. 1,651,621 to O'Sullivan wherein a prior art sundial organization is typically mounted in a fixed support mount not capable of repositioning once in a fixed site.

U.S. Pat. No. 4,845,853 to Haskett sets forth a contemporary sundial organization with a plurality of adjustments, but limited in the use of a single horizontal cross hair for defining a time of day reference, as well as limited adjustment relative to the instant invention to accommodate various support variations by individuals in mounting of the sundial as opposed to the instant invention.

U.S. Pat. No. 3,303,567 to Blanks sets forth a sundial organization utilizing a convex face.

U.S. Pat. No. 4,890,269 to Buckner provides for a generally pocket sized solar time piece and associated compass structure for arranging the member in a given geographical location.

U.S. Pat. No. 4,520,572 to Spilhaus sets forth a geographical sundial utilizing a stationary base and convex sundial head in a manner to plot solar travel.

As such, it may be appreciated that there continues to be a need for a new and improved sundial apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of sundial apparatus now present in the prior art, the present invention provides a sundial apparatus wherein the same sets forth a design utilizing a multi-plane adjustment construction to permit ease of adjustment and set-up of the sundial apparatus in any given geographical location. As such, the general purpose of the present invention, which will be described subsequently in greater detail, is to provide a new and improved sundial apparatus which has all the advantages of the prior art sundial apparatus and none of the disadvantages.

To attain this, the present invention provides a sundial apparatus wherein a sundial head mounts a semi-cylindrical sundial face mounting a vertical and horizontal cross hair to define time of day, as well as an associated weekly period during a solar year. The sundial face is mounted within a head member that in turn is rotatably mounted upon an upper rotater plate. The upper rotater plate is pivotally mounted between first and second "L" shaped support plates, and the "L" shaped support plate is rotatably mounted upon a mounting plate, with the mounting plate fixedly secured to a support member such as a post.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sundial apparatus which has all the advantages of the prior art sundial apparatus and none of the disadvantages.

It is another object of the present invention to provide a new and improved sundial apparatus which may be easily and efficiently manufactured and marketed.

It is a further object of the present invention to provide a new and improved sundial apparatus which is of a durable and reliable construction.

An even further object of the present invention is to provide a new and improved sundial apparatus which is susceptible of a low cost of manufacture with regard to both materials and labor, and which accordingly is then susceptible of low prices of sale to the consuming public, thereby making such sundial apparatus economically available to the buying public.

Still yet another object of the present invention is to provide a new and improved sundial apparatus which provides in the apparatuses and methods of the prior art some of the advantages thereof, while simultaneously overcoming some of the disadvantages normally associated therewith.

Still another object of the present invention is to provide a new and improved sundial apparatus wherein the same is arranged for providing a trio of planer rotative adjustments to accommodate variations in geographical mounting of the organization.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
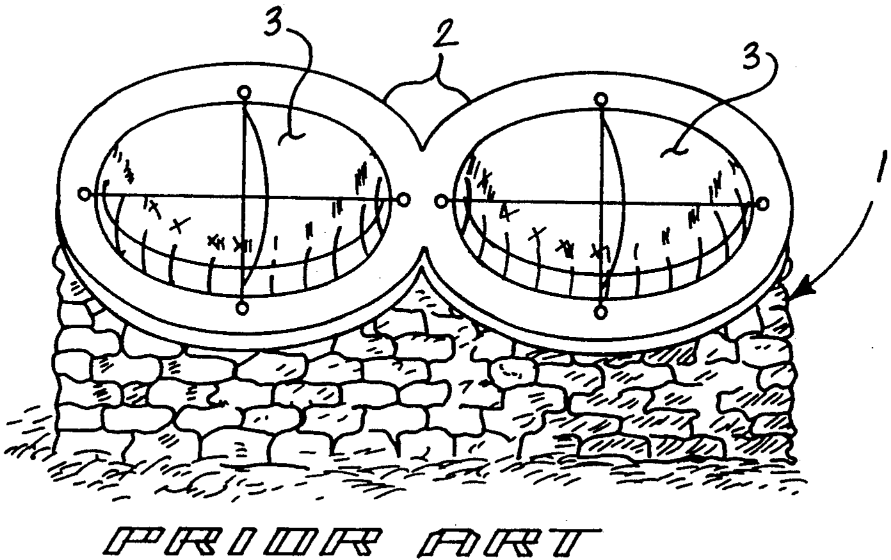
FIG. 1 is an orthographic frontal view, taken in elevation, of a prior art sundial apparatus.

With reference now to the drawings, and in particular to FIGS. 1 to 9 thereof, a new and improved sundial apparatus embodying the principles and concepts of the present invention and generally designated by the reference numeral 10 will be described.

Figure 2:
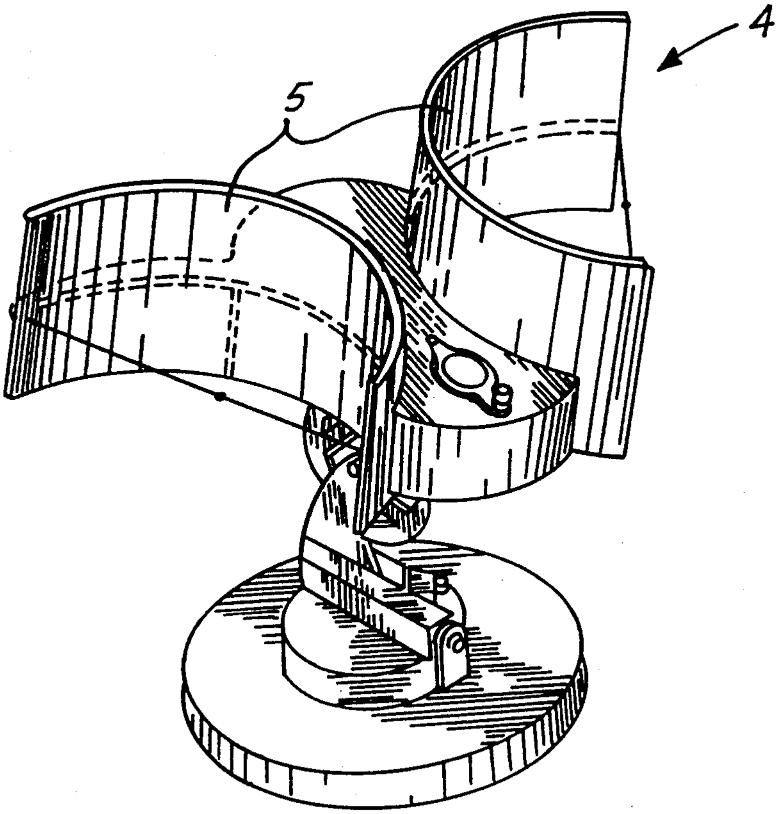
PRIOR ART FIG. 2
FIG. 2 is an isometric illustration of yet another prior art sundial apparatus.

FIG. 1 illustrates a prior art sundial organization 1, wherein the concave sundial bowls 3 are provided with a cross hair structure, wherein the sundial bowls are mounted within adjacent fixed ports 2, as illustrated and set forth in U.S. Pat. No. 1,651,621. U.S. Pat. No. 4,845,853 sets forth a sundial organization 4 as illustrated in FIG. 2, wherein concave semi-cylindrical faces 5 are mounted within a framework, as illustrated in and set forth in the patent. Further, U.S. Pat. No. 4,520,572 incorporated herein by reference sets forth a typical image traverse of the sun and its path.

Figure 3:
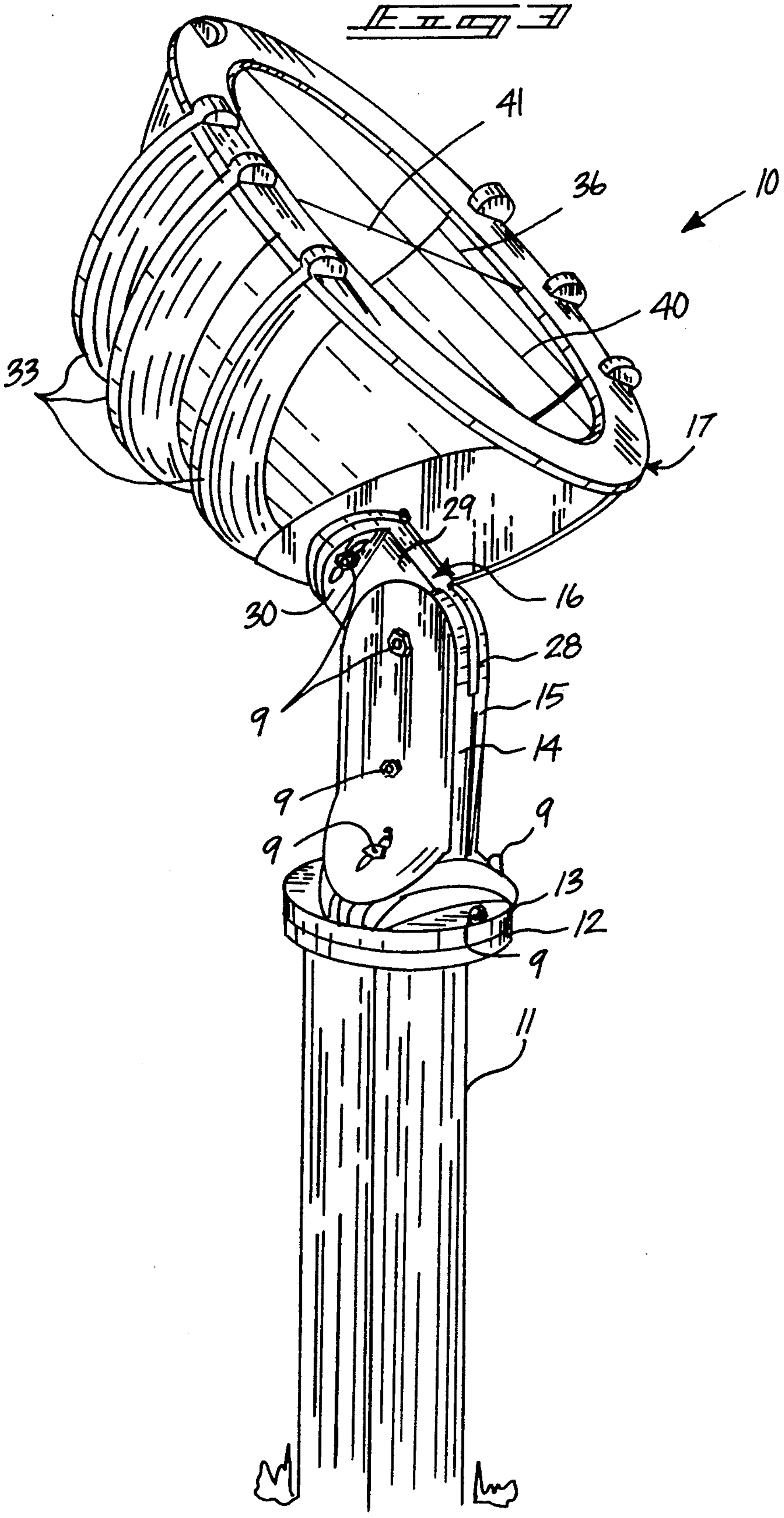
FIG. 3 is an isometric illustration of the instant invention.
Figure 4:
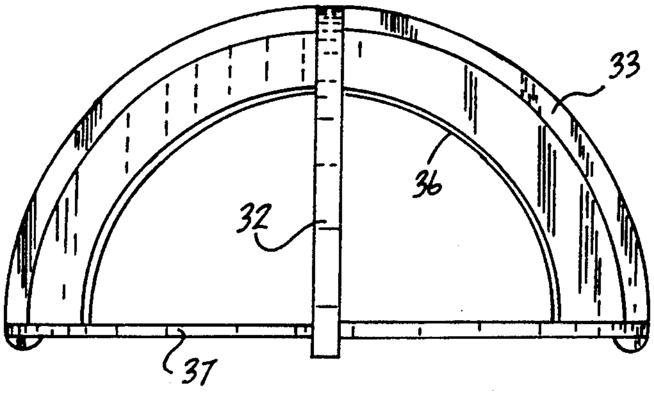
FIG. 4 is an orthographic top view of the sundial head of the instant invention.
Figure 5:
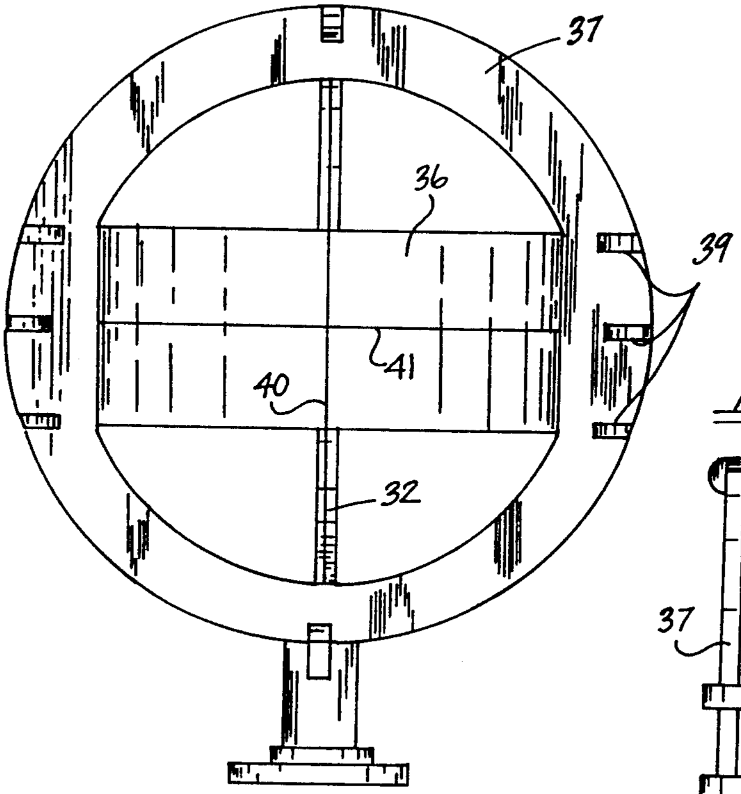
FIG. 5 is an orthographic frontal view, taken in elevation, of the sundial head of the instant invention.
Figure 6:
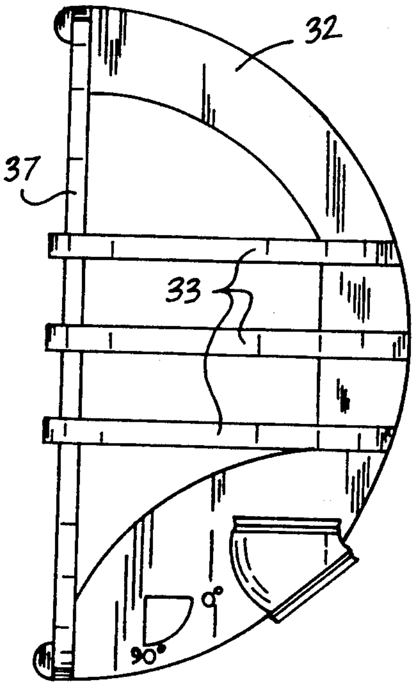
FIG. 6 is an orthographic side view, taken in elevation, of the sundial head of the instant invention.

More specifically, the sundial apparatus 10 of the instant invention shown in FIG. 3, essentially comprises support base 11 set forth as a post, with a mounting plate 12 fixedly secured thereon. A lower rotation plate 13 is adjustably mounted and coaxially aligned with the support base and mounting plate 12. A respective first and second "L" shaped vertical support plate 14 and 15 are secured together in a back-to-back relationship defining a support plate slot 28 therebetween, with the two support plates at an upper end thereof, with an upper rotation plate 16 including an upper rotation plate vertical flange 29 captured between and mounted for pivotal rotation within the slot 28. The upper rotation plate 16 includes an upper rotation horizontal flange 30 rotatably mounted to a sundial head member 17. As illustrated, various fastener members 9 are utilized in securement of the various components and organization together.

Figure 7:
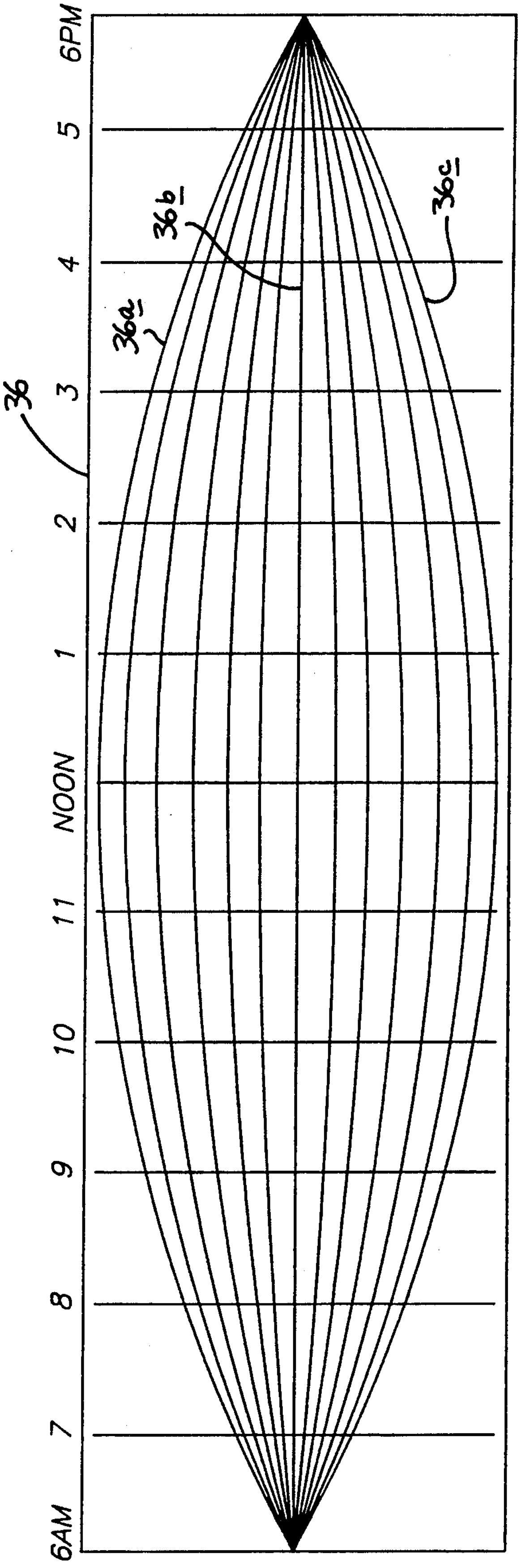
FIG. 7 is a diagrammatic illustration of the sundial face and the typical solar shadow traverse thereabove.
Figure 8:
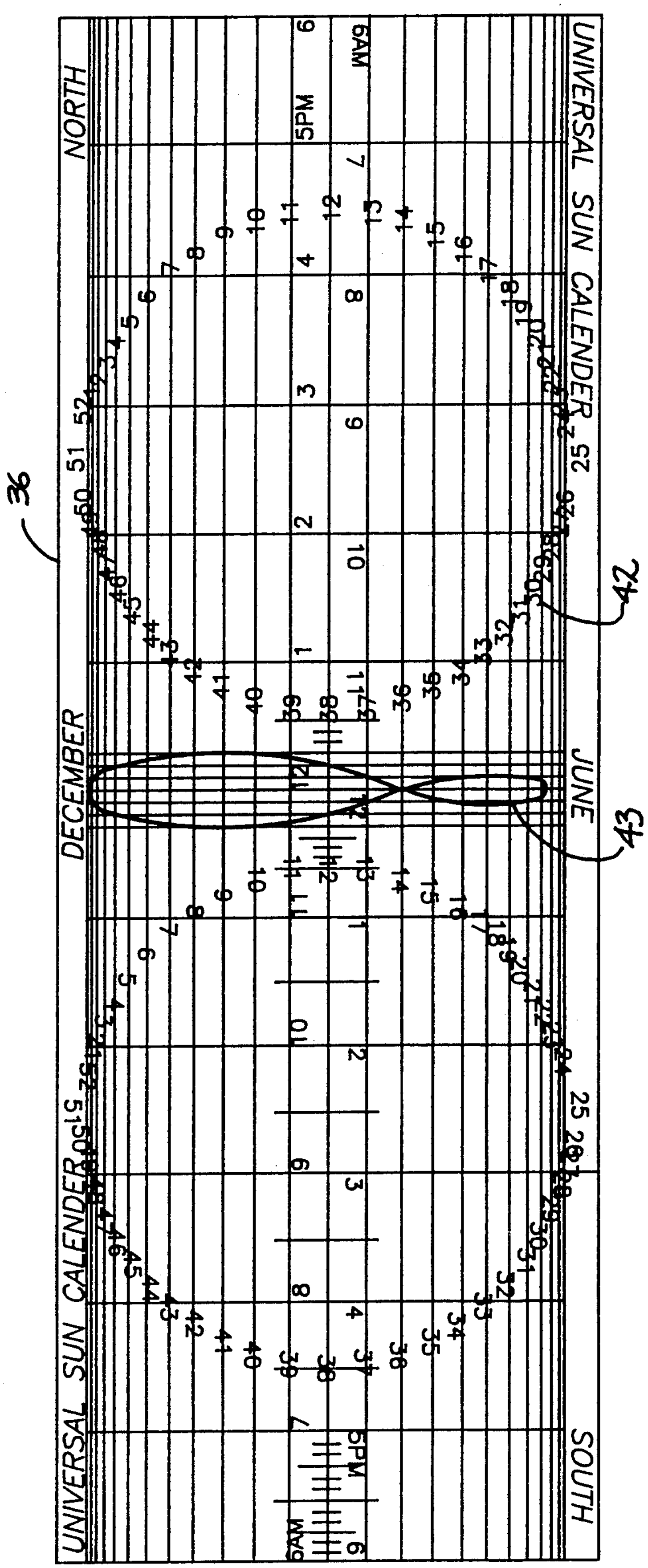
FIG. 8 is a diagrammatic plan view of the sundial face setting forth a typical calendar arrangement thereon.
Figure 9:
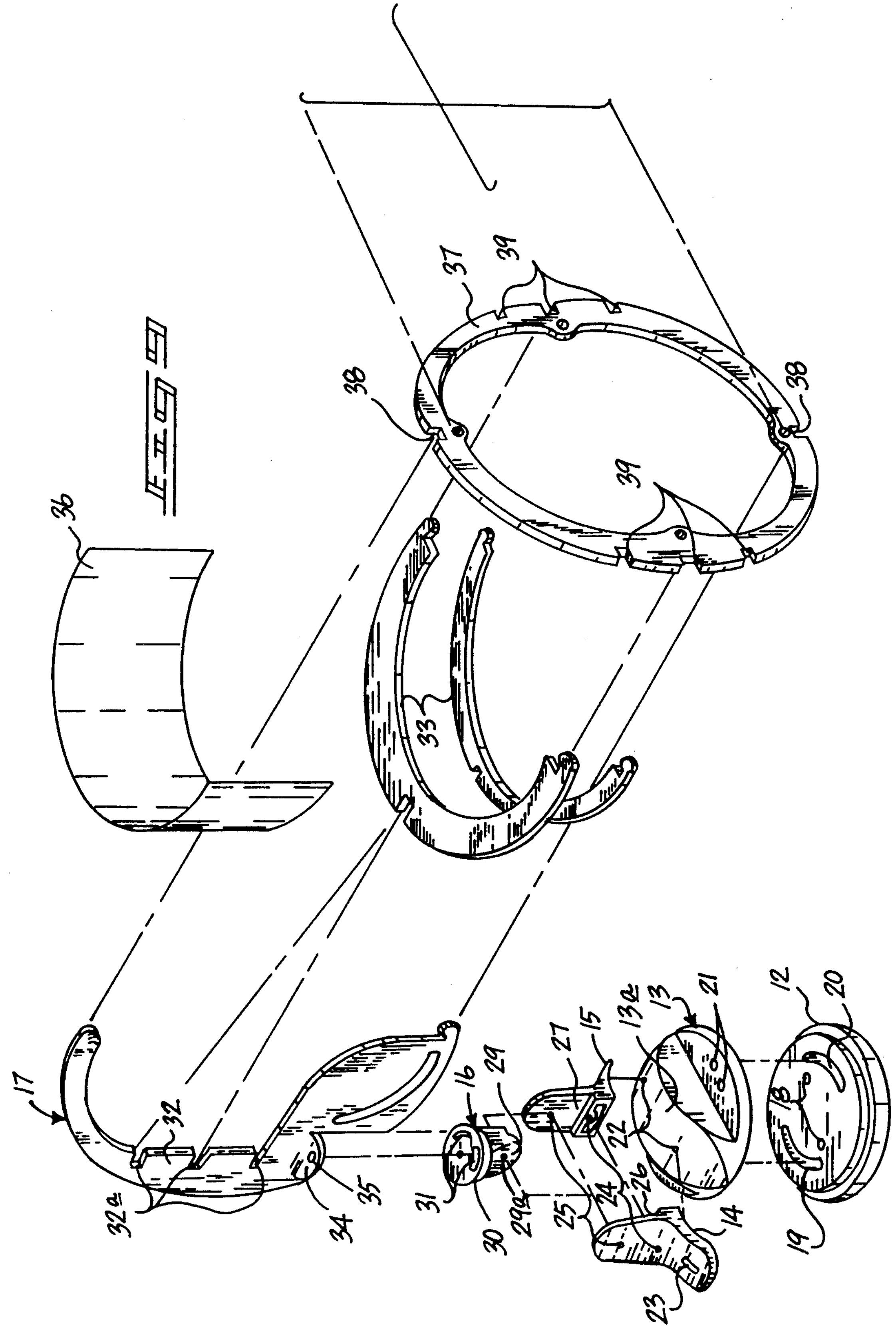
FIG. 9 is an isometric exploded illustration of the sundial structure of the instant invention.

Reference to FIG. 9 illustrates the mounting plate 12, including a plurality of mounting apertures 18 directed through the mounting plate 12 to secure the mounting plate to the support base or post 11. A first and second arcuate slot 19 and 20 are directed through the mounting plate 12 diametrically opposed to one another and parallel to an axis defined by the cylindrical mounting plate. The arcuate slots 19 and 20 each receive a fastener that in turn is directed through a fastener directing bore 21 of a plurality of bore pairs 21, with a bore pair associated with each arcuate slot to permit relative rotation of the lower rotation plate 13 relative to the mounting plate 12. Rotation plate mounting bores 22 are provided to secure each respective "L" shaped support plate 14 and 15 into association with a respective bore, wherein vertical support plate slots 23 are directed through each horizontal leg of each support plate to permit relative adjustment of each support plate in a spatial relationship relative to one another. A support plate lower bore 24 is provided to receive a fastener 9 and secure the plates together while the support plates 14 and 15 each includes a respective support plate upper bore 25 directed through an upper rotation plate vertical flange bore 29*a* that is orthogonally directed through the vertical flange 29 of the upper rotation plate 16 to permit relative rotation of the upper rotation horizontal flange 30 relative to the support plate slot 28 (FIG. 3). As illustrated, the upper rotation plate horizontal flange 30 is orthogonally oriented relative to the upper rotation plate vertical flange 29, with the horizontal flange 30 including a plurality of horizontal flange arcuate slot pairs 31 to each accommodate a fastener to secure the sundial head member 17 rotatably to the top surface of the horizontal flange 30. The sundial head member 17 includes a planar "C" shaped support 32 mounting a head mounting flange 34 that includes a plurality of head mounting flange bores 35, with each bore 35 cooperating with a respective arcuate slot 31 utilizing a fastener 9. The "C" shaped head support 32 includes a plurality of spaced notches 32*a* to receive a plurality of planer "C" shaped ribs 33 orthogonally relative to the support 32 and medially of each rib 33 and to secure each rib 33 in an orthogonal relationship relative to the "C" shaped support head 32. A semi-cylindrical dial face 36 is secured within the series of ribs 33, with a mounting ring 37 captured between the upper and lower terminal ends of the "C" shaped support head 32 at upper and lower terminal ends thereof within the vertical notches 38, with the mounting ring 37 including horizontal notches 39 to secure opposed terminal ends of each rib 33 therewithin each pair of aligned notches. The organization includes a vertical cross hair 40 and a horizontal cross hair 41 to provide shadows upon the semi-cylindrical dial face 36, with the vertical shadow indicating the time of day and the horizontal shadow indicating the number of weeks traversed in the solar year or alternatively, the number of months. Such face 36 is typified in FIG. 8. FIG. 7 illustrates the traverse of the shadow of the horizontal cross hair path at its intersection with the vertical crosshair with the numeral 36*a* illustrating the shadow of the horizontal cross hair shadow in the day of the winter solstice, the line 36*b* indicating the shadow of the horizontal cross hair of the spring and fall equinox, and the shadow 36*c* or path thereof defining the day of the summer solstice. FIG. 8 illustrates the use of a conventional analemma diagram which is utilized for categorizing correct clock time from the solar time indicated in the sun dial, with the paths 42 indicating an associated week of a solar year in traverse of the horizontal shadow.

The rotation of the lower rotation plate 13 to the mounting plate 12 permits rotational adjustment of the organization allowing the unit to face South in a Northern hemisphere, or North in the Southern hemisphere. The rotation of the upper rotation plate 16 within the support plate pair slot 38 permits the organization to be set up in the proper latitude alignment within a geographical location, wherein rotation of the head mounting flange 34 to the upper rotation plate horizontal flange 30 permits adjustment to clock time of the sundial head member 17. The slotted vertical support plate mounting slots 23 about the convex surface 13*a* permits compensation for vertical misalignment of the support base post 11 as required, with the slot 23 permitting rotation of the head member 17 over the convex surface 13*a*.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sundial apparatus comprising, a support base, the support base including a mounting plate fixedly secured thereon, and a lower rotation plate pivotally mounted to the mounting plate, and a plurality of vertical support plates adjustably mounted to the lower rotation plate, and an upper rotation plate pivotally mounted to the support plates, and a sundial head member pivotally mounted to an upper surface of the upper rotation plate, and wherein the mounting plate includes a plurality of mounting apertures for securement of the mounting plate to the support base, and the mounting plate further including a plurality of diametrically opposed first and second arcuate slots, the arcuate slots oriented parallel to an axis defined by the mounting plate, and the lower rotation plate including at least one fastener directing bore associated with each slot of the first and second arcuate slots to position a fastener through each bore and through each slot of the first and second arcuate slots, and wherein the lower rotation plate further includes a convex surface diametrically disposed and integrally secured to an upper surface of the lower rotation plate, with the convex surface directed upwardly thereof, and each support plate of the first and second support plates are of an "L" shaped configuration, and each of the support plates including a vertical support plate mounting slot directed through a horizontal leg of each support plate, and a further fastener directed through each of the vertical support plate mounting slots within an associated lower rotation plate mounting bore, with each lower rotation mounting bore directed into the convex surface, and each of the first and second "L" shaped support plates secured together in a back-to-back relationship to define a vertically disposed support plate pair slot, wherein the support pair slot pivotally receives the upper rotation plate therewithin.

2. An apparatus as set forth in claim 1 wherein the upper rotation plate includes a vertical flange, wherein the vertical flange is pivotally received within the support plate pair slot, and the vertical flange including a horizontal flange, the horizontal flange orthogonally oriented relative to the vertical flange, and the horizontal flange further including a plurality of horizontal flange slots, and the horizontal flange slots are each associated with a respective head mounting flange bore, wherein the sundial head member includes a "C" shaped head support, the "C" shaped head support includes a head mounting flange, and the head mounting flange includes the head mounting flange bores, and the "C" shaped head support includes a plurality of "C" shaped ribs, each of the "C" shaped ribs orthogonally mounted to the "C" shaped head support medially of each rib, and the ribs contain therewithin a semi-cylindrical dial face, and a mounting ring orthogonally secured to the ribs and the "C" shaped head support, with the ring including a vertical cross hair and a horizontal cross hair orthogonally oriented relative to one another to overlie the semi-cylindrical dial face.

* * * * *